United States Patent [19]

Bergmann

[11] Patent Number: 4,554,948
[45] Date of Patent: Nov. 26, 1985

[54] STRAIGHT-WAY VALVE

[75] Inventor: Konrad Bergmann, Wittlich, Fed. Rep. of Germany

[73] Assignee: American Standard Inc., New York, N.Y.

[21] Appl. No.: 623,642

[22] Filed: Jun. 22, 1984

[51] Int. Cl.$^4$ .............................................. F16K 3/08
[52] U.S. Cl. ................................ 137/625.31; 251/304
[58] Field of Search .................. 137/625.31; 251/304, 251/180

[56] References Cited

U.S. PATENT DOCUMENTS

| | | | |
|---|---|---|---|
| 1,607,827 | 11/1926 | Herrmann | 251/304 X |
| 1,738,135 | 12/1929 | Bannister | 137/625.31 |
| 3,026,899 | 3/1962 | Mischanski | 251/304 X |
| 4,098,294 | 7/1978 | Woods | 137/625.31 X |

FOREIGN PATENT DOCUMENTS 1216488 11/1959 France ............................ 137/625.31
1235296 12/1960 France ............................ 137/625.31

*Primary Examiner*—Arnold Rosenthal
*Attorney, Agent, or Firm*—James J. Salerno, Jr.; Robert G. Crooks; John P. Sinnott

[57] ABSTRACT

A straight-way valve comprising a valve body having regulating elements is mounted therein. The valve regulating elements include a plurality of discs, one of which is mounted for rotation and at least one of the other discs is statically mounted in valve body. The rotatable disc has a plurality of flow ports, which correspond with flow ports formed in the at least one static disc. The at least one static disc is arranged in face-to-face contact against the rotatable disc to form a fluid tight, mechanical seal. An actuating device is coupled to the rotatable disc and is mounted for rotation in said valve body. The actuating device includes means, which extend through the valve body for rotating the disc from an opened to a closed position.

4 Claims, 6 Drawing Figures

STRAIGHT-WAY VALVE

FIELD OF THE INVENTION

The subject matter of the invention relates to a straight-way valve having regulating elements in the form of discs, one of which is axially mounted for rotation and having flow ports which correspond with flow ports formed in at least one statically mounted disc, and the axially mounted disc is interfaced with the at least one statically mounted disc to form a mechanical seal. An actuating device, in the form of a lever, extends radially from the rotatable disc, which is provided for opening and closing the straight-way valve.

PRIOR ART

A straight-way valve of this type for the regulation and flow interruption of fluids is known, such as shown in DT-PS No. 896 438. In this patent, a shut-off gate valve is described and illustrated, which is particularly useful for pipes carrying high-pressure steam. Instead of a sliding shut-off gate valve plate, a check disc rotating around the pipe axis is employed as a shut-off element with flow ports corresponding with flow ports in two static discs in the form of so-called guide elements. The discs with intermediate seals are arranged against the rotating check disc. The outer ends of these guide elements are supported in each case by an annular shoulder on each of two valve body tubular sections, which are symmetrical to each other, and which are connected together and axially fixed by a sleeve-type case, which concentrically encloses them via diaphragm seals. For operation of the rotating check disc, a spindle is located in a bore arranged tangentially to the tubular wall section of the sleeve-type case, which spindle operates the rotating check disc via a worm gear. The rotating spindle is sealed by means of a stuffing box and a gland which screws into the bore. The seal between the gland and the bore is in the form of a welded diaphragm seal. A similar design is shown in DT-PS No. 1103097. In this patent, recesses are formed into the partially geared rotating check disc, in which recessed, segment-shaped movable shut-off plates are supported and located. A disadvantage in the straight-way valves already in use is that they are relatively elaborate in design and correspondingly expensive to manufacture. The overall dimensions are relatively large and several dynamically loaded soft seals are required which, similarly to the worm gear drive mechanism, are subjected to comparatively high wear. In order to avoid using dynamically loaded soft seals, it might be conceivable to employ disc-shaped regulating elements made of extremely hard material, such as oxide ceramics. Ceramic valve elements have proved extremely successful over the years in the case of sanitary water valves because the valve elements form a direct mechanical seal when interfaced. Nevertheless, the operation of a rotating, regulating disc by means of a drive mechanism, such as that described and illustrated in the patents mentioned, requires particularly elaborate and correspondingly expensive designs and would be impractical from both the operational and cost standpoint to cut the necessary toothing into a moving regulating disc made of ceramic oxide. Straight-way valves of the type according to the invention are, also, shown in DT-OS No. 29 45 834. In this patent, in one of several valve arrangements illustrated, a rotating regulating cylinder acts as the regulating disc, having an actuating device in the form of a lever, which is mounted through a peripheral opening in the valve body and can be manually swivelled. The lever is connected to the regulating cylinder by means of a screw connection. Connections of this kind between the actuating device and the rotating, regulating disc are only necessary if this regulating disc is made of metal or plastics. If the moving regulating disc were made of ceramic oxide, however, a screw connection of this kind with the actuating device would also be impractical from the operational and cost standpoint.

SUMMARY OF THE INVENTION

The invention is based on the technical problem of removing these disadvantages and providing a straight-way valve of the type described hereinbefore, which utilizes disc-shaped regulating elements of a hard material, such as ceramic oxide, in which the regulating elements directly interface to form a seal, to provide a straight-way valve, which is simple in design and reliable in operation.

This object has been successfully achieved by the fact, that for the purpose of radially retaining the actuating device for the axially mounted disc, the disc is at least partially and annularly enclosed by the actuating device, which, is positively locked to the rotatably mounted disc by means of lugs or grooves with regard to torque transfer only. Also, the annular part of the actuating device is housed in a receptable space in the valve body, while a lever-shaped part of the actuating device extends outwards and is either manually operated or mechanically operated such as by motor. In accordance with the invention, a connection between the rotating or regulating disc and the actuating device is subjected to only torque transfer forces, apart from the radial retainment effect, while at the same time, the actuating device is free from transverse forces, so that the sealing function of the rotatable disc is not adversely affected.

In accordance with a further development of the invention, the transverse forces acting on the annular part of the actuating device are absorbed by the lateral boundary faces of the receiving space. These boundary faces laterally locate the actuating device, either directly or by means of intermediate bearing rings positioned in the receiving space of the valve body. According to another aspect of the invention, a receiving space is formed by an annular groove in the valve body. In accordance with a further aspect of the invention, the rotatable disc is of a smaller diameter than the annular groove formed in the valve body.

BRIEF DESCRIPTION OF THE DRAWINGS

Further advantageous features of the invention are readily apparent from the following description of the design example of a straight-way valve, which is illustrated in the drawings wherein.

DESCRIPTION OF THE PREFERRED EMBODIMENT

Figure 1:
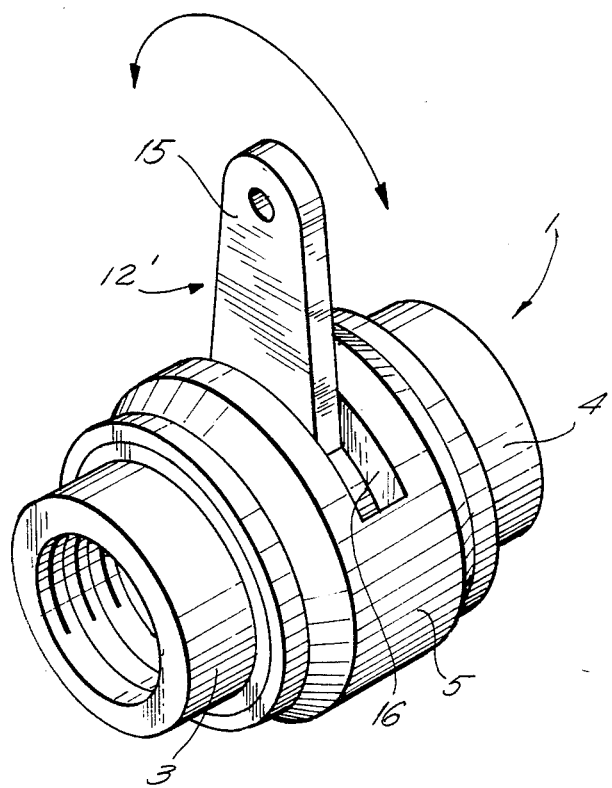
FIG. 1 is an isometric view of the straight-way valve adapted to be operably mounted in a fluid flow line, according to the invention.
Figure 6:
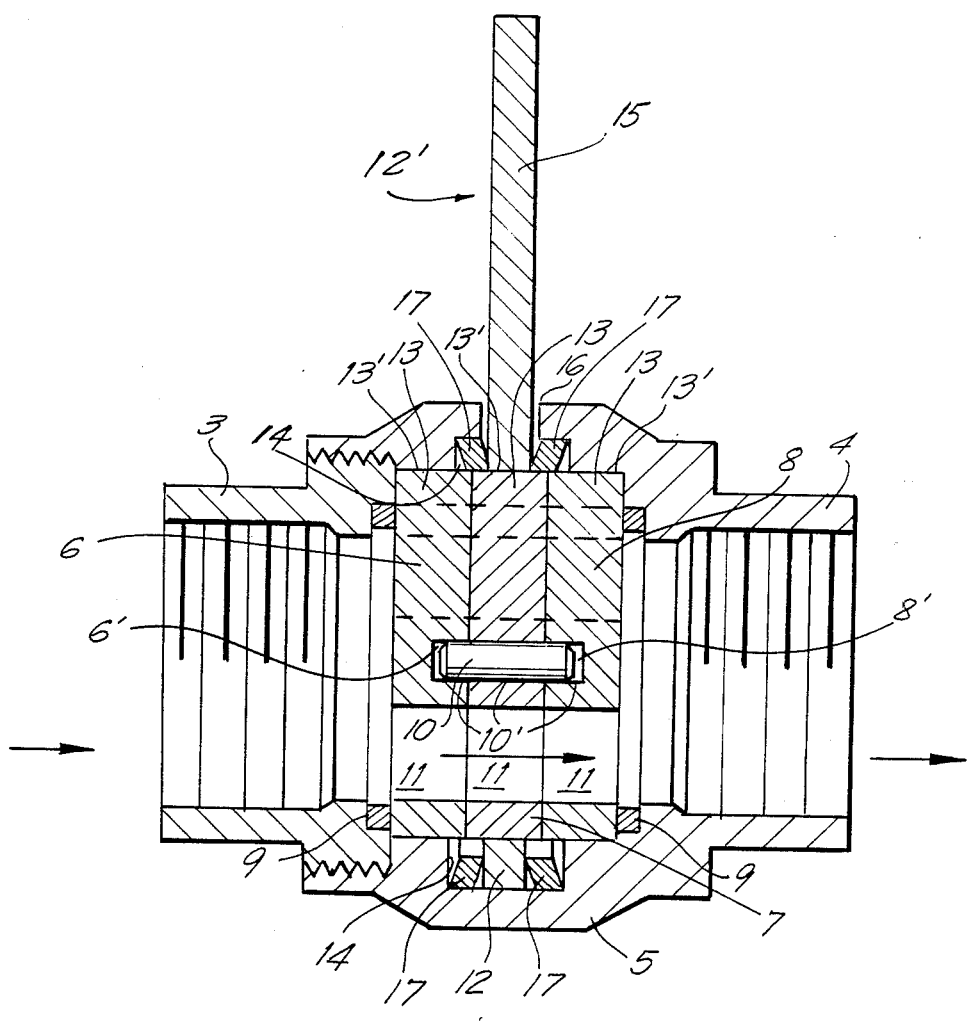
FIG. 6 is a sectional view in elevation of the valve taken along line 6—6 of FIG. 1.

A valve assembly 1 is illustrated in FIGS. 1,6, which includes two connection bases 3,4, which are separated by middle section 5, which houses the valve regulating elements. The regulating elements include three discs 6,7 and 8, of which the center disc 7 is axially mounted for rotational motion. The discs 6,7 and 8 are preferably formed of aluminum oxide and are mounted against each other in face-to-face contact to form a mechanical, fluid tight seal. The two static discs 6 and 8 are pressed, respectively, against the opposite faces of the rotating disc 7 by means of seal rings 9. Shaft pin 10 is mounted through axial bore 10' formed in rotating disc 7, the ends of which are disposed in corresponding axial recesses 6',8' formed in the static discs 6 and 8. The discs 6,7 and 8 are provided with flow ports 11.

Figure 2:
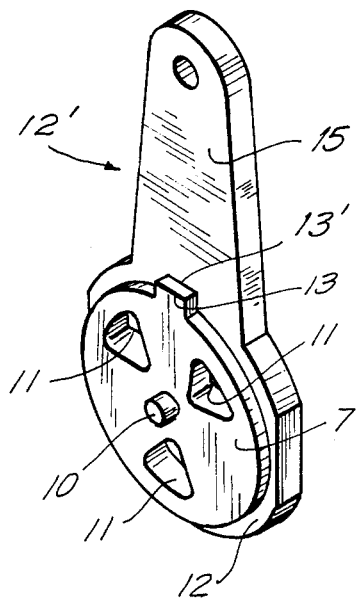
FIG. 2 is an isometric view of the rotatable valve element mounted in the valve actuating means.
Figure 3:
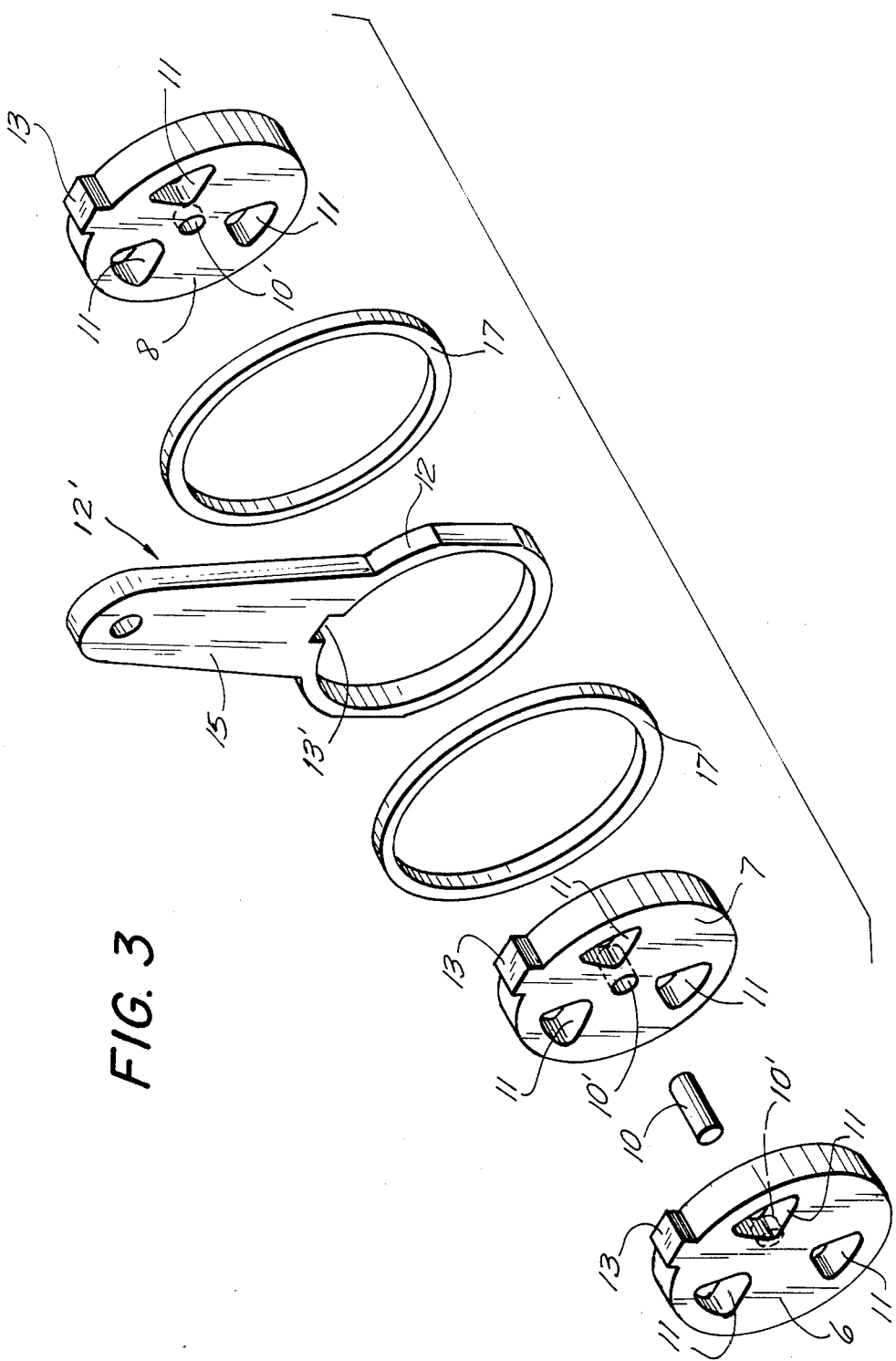
FIG. 3 is an exploded isometric view of the straight-way valve of FIG. 1, illustrating the arrangement of its operable regulating elements.
Figure 4:
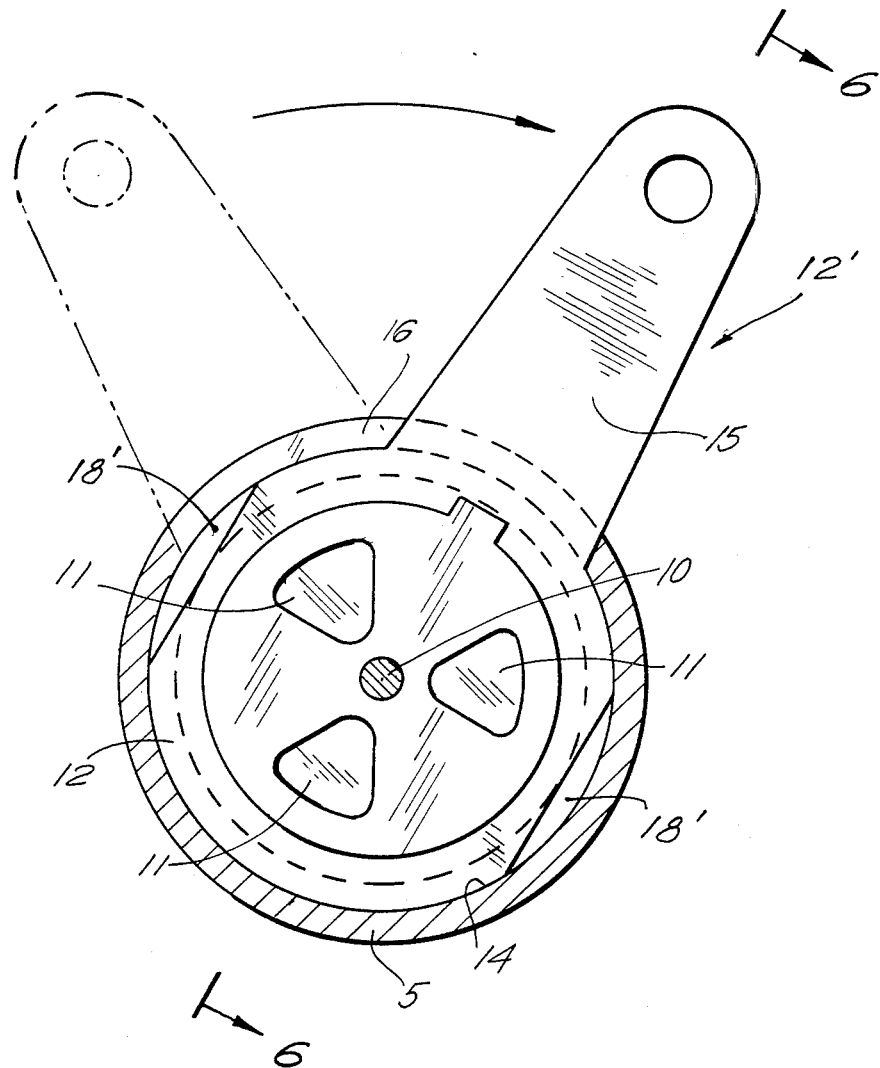
FIGS. 4 & 5 are elevational views in section of the straight-way valve of FIG. 1, illustrating the position of the valve actuating means in its open and closed positions respectively.
Figure 5:
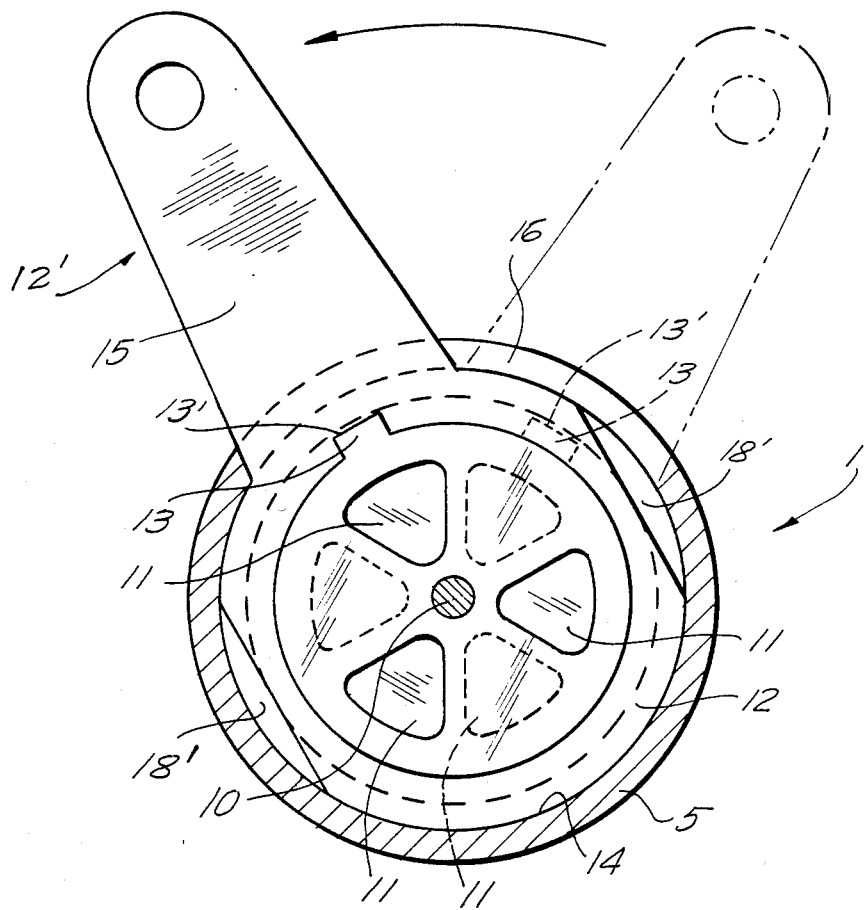

As is shown in FIG. 2, actuating device 12' is formed having an annular part 12, which completely houses rotatable disc 7 so that disc 7 is radially located. Disc 7 is formed having a lug 13, which nests into a corresponding groove 13', formed in the annular part 12 of the actuating device 12', so that rotatable disc 7 is immoveably mounted in actuating device 12' with regard to torque transfer. A groove or annular recess 14 is formed in middle section 5 of the valve body, which receives annular part 12 of actuating device 12' for rotation therein, while a lever-shaped part 15 of the actuating device 12' protrudes outwards through a longitudinal slot 16 in the valve body so that straight-way valve is manually turnable. Bearing rings 17 are positioned in receiving space 14 and are in the form of cup springs, which exert spring pressure in the axial direction on the annular part 12 of the actuating device 12' and in this way absorb transverse forces. The bearing rings 17 are only partially supported by annular part 12, thus providing venting openings 18'.

As described above, the illustrated and described design is only one example for practicing the invention and should not be limited thereby; rather, the basic principal, according to the invention, provides for variations in design and materials, particularly with regard to the arrangement of the individual parts, including the actuation of the rotatable regulating disc. For example, in order to form the receiving space for the annular part of the actuating device, the rotating disc could be designed having a smaller diameter in comparison with the static discs. Furthermore, the lever-shaped part of the actuating device could also be turned by motor power.

I claim:

1. A straight-way valve comprising:
    a valve body having a longitudinal passageway extending therethrough and a circumferential slot formed between the ends of said passageway;
    said valve body having an annular recess formed between the ends of said passageway and being aligned with said circumferential slot;
    regulating elements, operably mounted in said valve body, which include a plurality of discs, one of which is mounted for rotation, at least one of said other discs being statically mounted in said valve body and actuating means disposed in said slot and coupled to said rotatable disc;
    said rotatable disc having a plurality of flow ports which correspond with flow ports formed in said at least one static disc;
    said at least one static disc being arranged in face-to-face contact against said rotatable disc to form a fluid tight, mechanical seal;
    said actuating means including an annular part positioned in said annular recess and a lever part which extends outwardly through said circumferential slot, and said rotatable disc being immovably mounted in said annular part;
    a pair of resilient bearing rings, being spaced in said annular recess, and positioned around opposed faces of said annular part to provide spring pressure in the axial direction and to absorb transverse forces with respect to said annular part and to provide vent openings therebetween to vent said straight-way valve; and
    an axle mounted through an axial bore formed in said rotatable disc, at least one end of which, is disposed in a corresponding recess of said at least one static disc for rotation therein so that said actuating means is rotatable from a first operable flow position to a second inoperable non-flow position.

2. The straight-way valve, according to claim 1, wherein said bearing rings are resiliently compressible and provide spring pressure in the axial direction on said annular part of said actuating device.

3. A straight-way valve according to claim 1, wherein said plurality of discs includes a rotatable disc disposed between a pair of statically mounted discs in said valve body and being arranged in face-to-face contact to form a fluid tight, mechanical seal, each of said discs having a plurality of corresponding flow ports so that said rotatable disc is operable from a first flow position to a second inoperable position, and said rotatable disc having an axle mounted through an axial bore therein, the ends of which are disposed in corresponding recesses formed in said statically mounted discs for rotation therein.

4. The straight-way valve of claim 1 wherein said plurality of discs are formed in aluminum oxide to provide a mechanical, fluid tight seal.

* * * * *